Sept. 11, 1945.  W. G. HOELSCHER  2,384,744
DRILL SPINDLE DRIVING MECHANISM
Filed July 28, 1939  14 Sheets-Sheet 1

INVENTOR.
BY William G. Hoelscher
Wood & Wood ATTORNEYS

Sept. 11, 1945.  W. G. HOELSCHER  2,384,744
DRILL SPINDLE DRIVING MECHANISM
Filed July 28, 1939 14 Sheets-Sheet 2

INVENTOR.
BY William G. Hoelscher
Wood & Wood
ATTORNEYS

Sept. 11, 1945.  W. G. HOELSCHER  2,384,744
DRILL SPINDLE DRIVING MECHANISM
Filed July 28, 1939  14 Sheets-Sheet 3

INVENTOR.
BY William G. Hoelscher
Wood & Wood ATTORNEYS

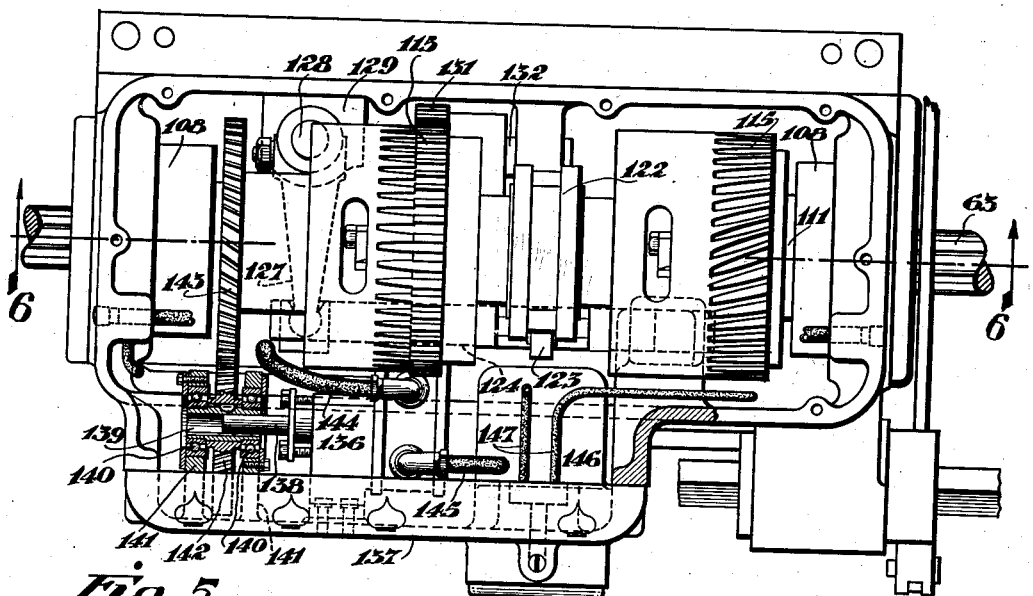

Sept. 11, 1945.   W. G. HOELSCHER   2,384,744
DRILL SPINDLE DRIVING MECHANISM
Filed July 28, 1939   14 Sheets-Sheet 5

INVENTOR.
William G. Hoelscher
BY Ward & Ward
ATTORNEYS

Sept. 11, 1945.   W. G. HOELSCHER   2,384,744
DRILL SPINDLE DRIVING MECHANISM
Filed July 28, 1939   14 Sheets-Sheet 6

INVENTOR.
BY William G. Hoelscher
Wood & Wood ATTORNEYS

Sept. 11, 1945.  W. G. HOELSCHER  2,384,744
DRILL SPINDLE DRIVING MECHANISM
Filed July 28, 1939  14 Sheets-Sheet 7
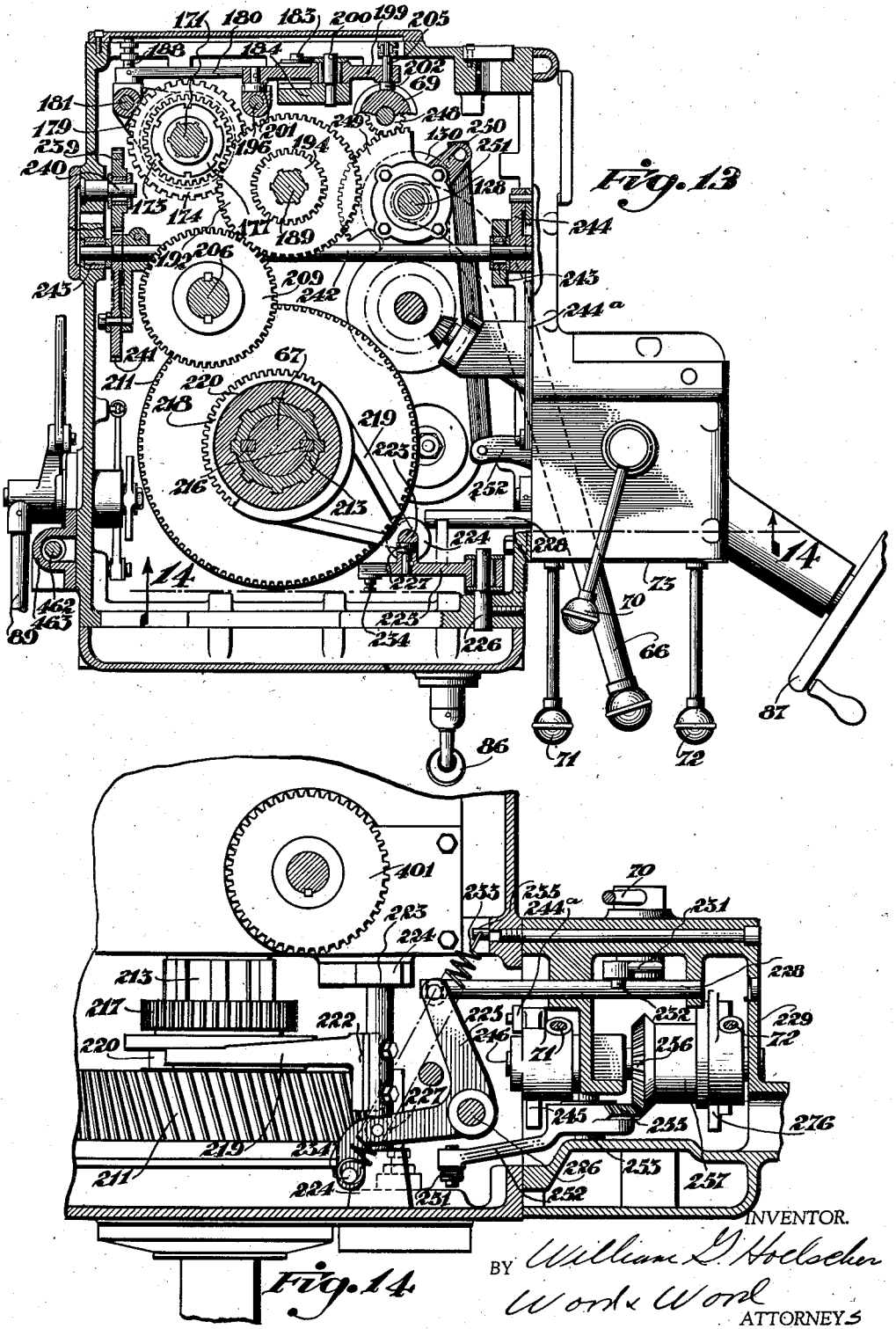

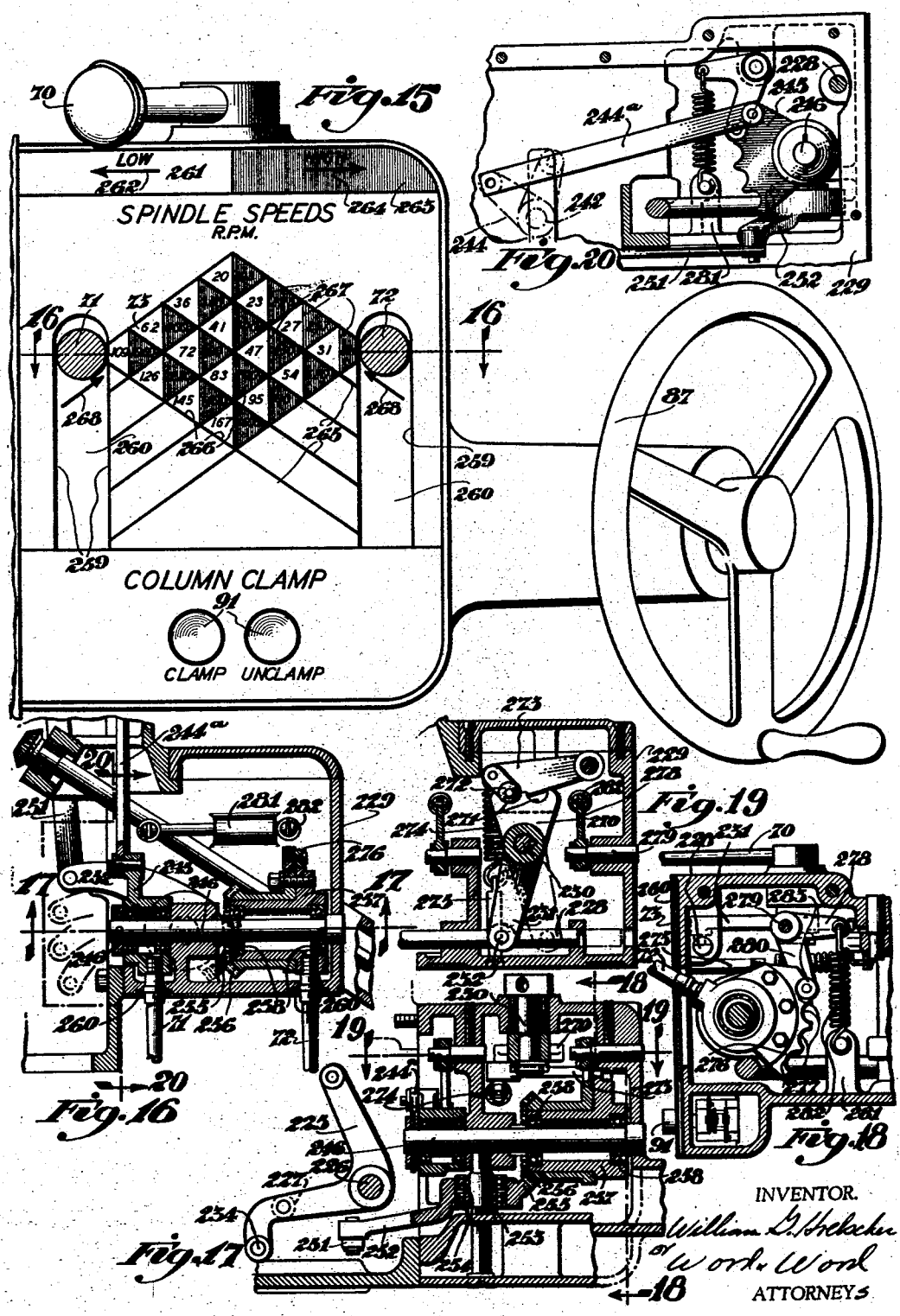

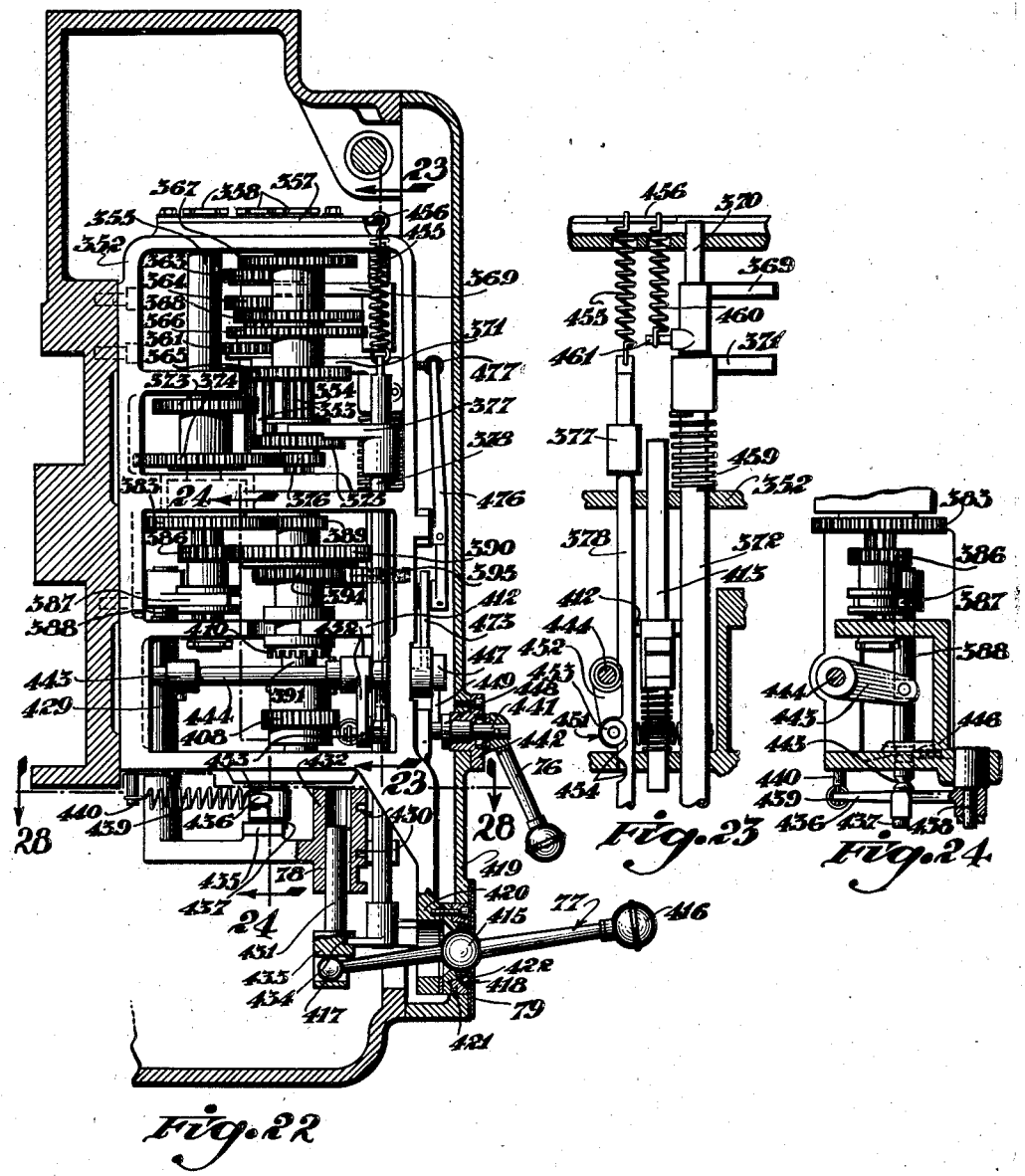

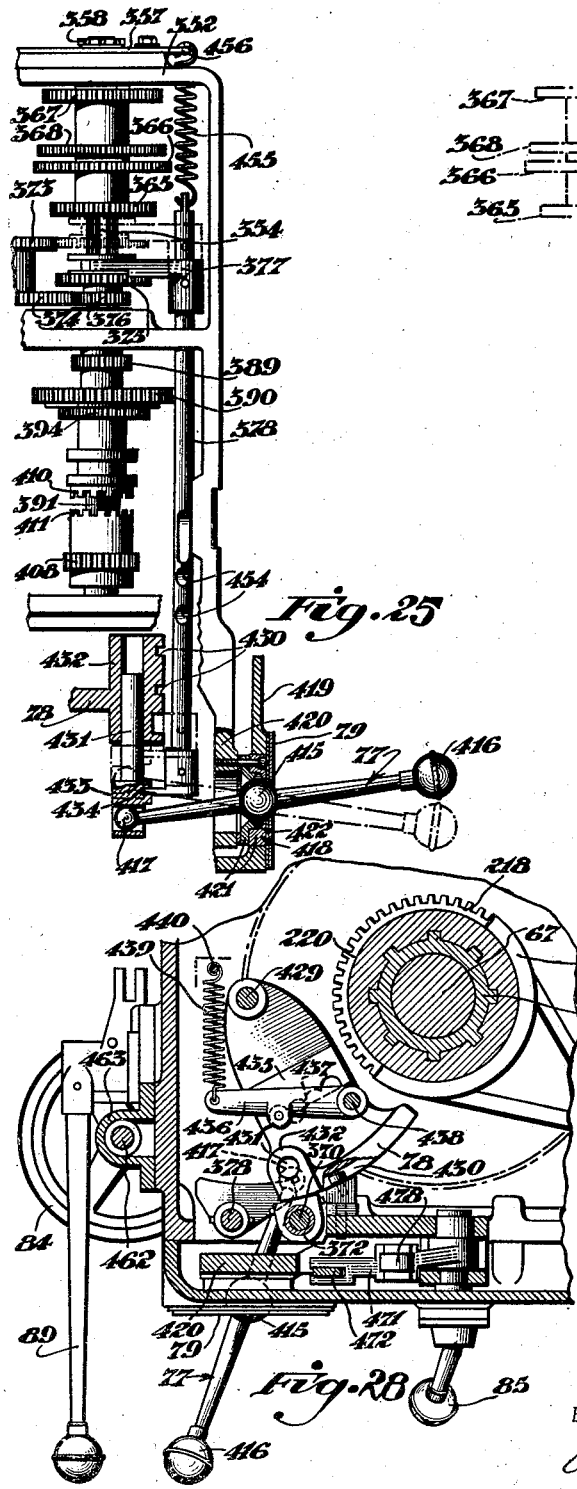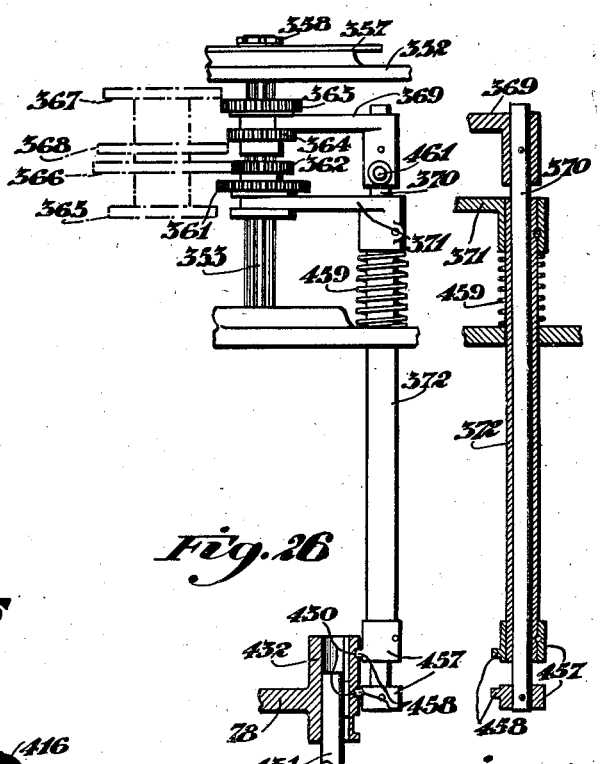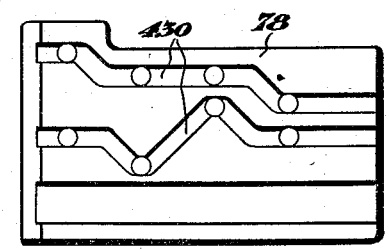

Sept. 11, 1945.   W. G. HOELSCHER   2,384,744
DRILL SPINDLE DRIVING MECHANISM
Filed July 28, 1939   14 Sheets-Sheet 12

INVENTOR.
BY William G. Hoelscher
Wood & Wood ATTORNEYS

Sept. 11, 1945.  W. G. HOELSCHER  2,384,744
DRILL SPINDLE DRIVING MECHANISM
Filed July 28, 1939  14 Sheets-Sheet 13

INVENTOR.
William G. Hoelscher
By Word & Word ATTORNEYS

Patented Sept. 11, 1945

2,384,744

UNITED STATES PATENT OFFICE 2,384,744

DRILL SPINDLE DRIVING MECHANISM

William G. Hoelscher, Cincinnati, Ohio, assignor to The American Tool Works Company, Cincinnati, Ohio, a corporation of Ohio Application July 28, 1939, Serial No. 287,132

11 Claims. (Cl. 77—28)

This invention relates to machine tools and is particularly directed to radial drills. More specifically, the invention is directed to improvements in the tool spindle operating mechanism.

It has been the object of the present inventor to provide an improved arrangement of the power shaft which delivers the power generally to the drill head of the radial drill. The improvement makes it possible to interchange without difficulty the main driving gears, which connect the motor to the head driving shaft. These gears are disposed in a position where they are conveniently accessible and where their removal does not require any substantial disassembly. Accordingly, in the event that the operator desires a general increase or decrease in speed to the head, he can quickly remove the component driving gears and replace the same with another set of component gears of the desired ratio.

It has been another object of the present inventor to provide spindle driving and feeding transmissions, each shifted by means of a pair of levers for providing the appropriate transmission connections. In each instance, one of the levers of the pair is for shifting between two ranges and the other is for shifting to the specific speeds or feeds within these ranges.

It has been the further object in this arrangement to provide these levers so that they are more conveniently shifted and so that the operator may determine the position of the respective transmissions by means of improved dials, greatly facilitating correct reading. In both transmissions, that is speed and feed, the dials provide panels having light and dark zones for the respective ranges. When the specific feed or speed control lever is in position indicating the speeds within a particular panel, the operator can readily determine whether or not it is low or high speed by observing the position of the range shifting lever relative to its panel which includes, as well, the light and dark zones. Thus, it is possible to read the speeds and feeds directly adjacent the levers, for the levers actually indicate the feeds or speeds by virtue of the positions of the levers relative to the panels.

It is a further object of the inventor to provide gear shifting means for the transmission of the spindle wherein a number of gears may be shifted from a single cam and wherein the gears shift easily and without frictional resistance. This is accomplished by counterbalancing means associated with each vertically supported gear.

It has been a still further object of the present inventor to provide an improved arrangement of gears whereby fewer gears are required for a given speed. The structure is more compact and less mechanism is required. A structure accomplishing this result may consist of a single intermediate shaft, effective for increasing speeds from one to four by the use of a cluster of three gears on the intermediate shaft and clusters of two gears each on the adjacent shafts. One of the adjacent clusters of two gears is shiftable relative to the cluster of three gears to accomplish two speeds, or may be shifted again relative to the cluster of three gears after the cluster of three gears has been moved to a second gear coupling position, thereby accomplishing two more speeds.

It has been a still further object of the inventor to provide an improved feed controlling and regulating mechanism for the spindle in which the feed is efficiently and accurately disconnected at any desired depth of boring operation and is automatically discontinued at a fixed point relative to the range of spindle travel whereby the spindle will be disconnected from the drive if the depth setting should be such as to carry the spindle out of its normal range. The arrangement used for feed disconnection is such that it will constantly maintain the coupling mechanism in position whereby the clutch is immediately automatically engaged after the adjustable stop dog is reset out of feed disconnection position. Also, the feed setting means is improved whereby the feed is more easily and accurately reset and controlled.

A further object has been to provide an improved drill spindle assembly sustained in an improved bearing arrangement, whereby the correct axial alignment of the spindle and true running of the drill are maintained. For this purpose, the transmission connection for transmitting the drive to the spindle is disposed approximately in the plane of the lower bearing. In this improved construction, the main driving gear, particularly for low speeds, is journaled independently of the spindle assembly so that those driving stresses on the teeth of this gear, which normally tend to disalign the spindle, are not conveyed to the spindle. Specifically, the drive gear is journaled concentrically with the spindle upon a heavy bearing sustained by the head. Therefore, the head receives the heavy driving stresses.

Another object has been to provide a radial drill head in which the various parts of the feed transmission and control and tripping mechanism assembly are readily accessible for replacement or repairs. In order to facilitate the assembly of the parts within the head, the feed gears, the shifting means and the tripping means of the feeding mechanism are assembled in a single bracket, which is removable bodily from the head.

Other improvements are disclosed as to the connections between the shifting levers and the gears wherein these parts are more compactly arranged and assembled, and wherein the shift of groups of gears in each transmission, that is, speed and feed, is accomplished through cams and shifting movement of the gears in the proper sequence and order is insured.

Other objects and certain advantages of the invention will be more fully apparent from the description of the accompanying drawings in which:

Figure 5 is a top plan view of the rear transmission casing of the head with the cover removed.

Figure 6 is a sectional view taken on line 6—6, Figure 5, illustrating the transmission extending from the drive shaft toward the base of the head.

Figure 13 is a sectional view taken on line 13—13, Figure 4, showing the gearing at the base of the head.

Figure 14 is a sectional view taken on the line 14—14, Figure 13, showing part of the speed gear shifting apparatus.

Figure 15 is an enlarged fragmentary front view of a portion of the head showing the dial and levers for spindle speed changes.

Figure 16 is a sectional view taken on line 16—16, Figure 15, showing the connection of shifting levers to the shifting means.

Figure 17 is a sectional view taken on line 17—17, Figure 16, further showing the shifting connections.

Figure 18 is a sectional view taken on line 18—18, Figure 17.

Figure 19 is a sectional view taken on line 19—19, Figure 17.

Figure 20 is a sectional view taken on line 20—20, Figure 16.

Figure 22 is a sectional view taken on line 22—22, Figure 1, showing the feed gearing in its actual position in the head.

Figure 23 is a sectional view taken on line 23—23, Figure 22, illustrating certain of the shift rods for the feed gears.

Figure 24 is a sectional view taken on line 24—24, Figure 22, showing additional details of the shifting mechanism.

Figure 25 is a fragmentary sectional view taken similarly to Figure 22, but showing one of the shifts diagrammatically.

Figure 26 is a diagrammatic view of the feed speed shifting means.

Figure 27 is a sectional view showing the telescoping arrangement of the shifting rods of Figure 26.

Figure 28 is a sectional view taken on line 28—28, Figure 22, showing the shifting cam in plan view.

Figure 29 shows a development of the cam tracks of the cam of Figure 28.

Figure 32 is a sectional view taken on line 32—32, Figure 30.

Figure 33 is a sectional view taken on line 33—33, Figure 30.

Figure 1:
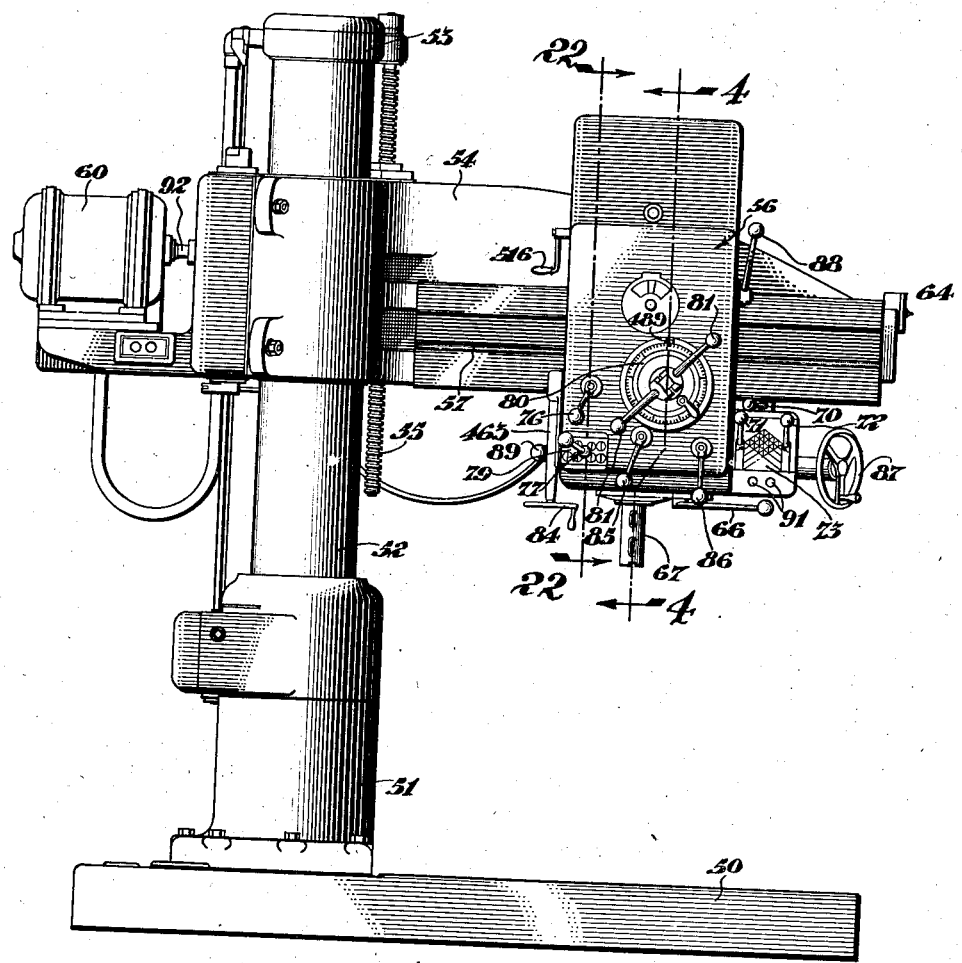
Figure 1 is a front view of a radial drill, incorporating the present invention.
Figure 2:
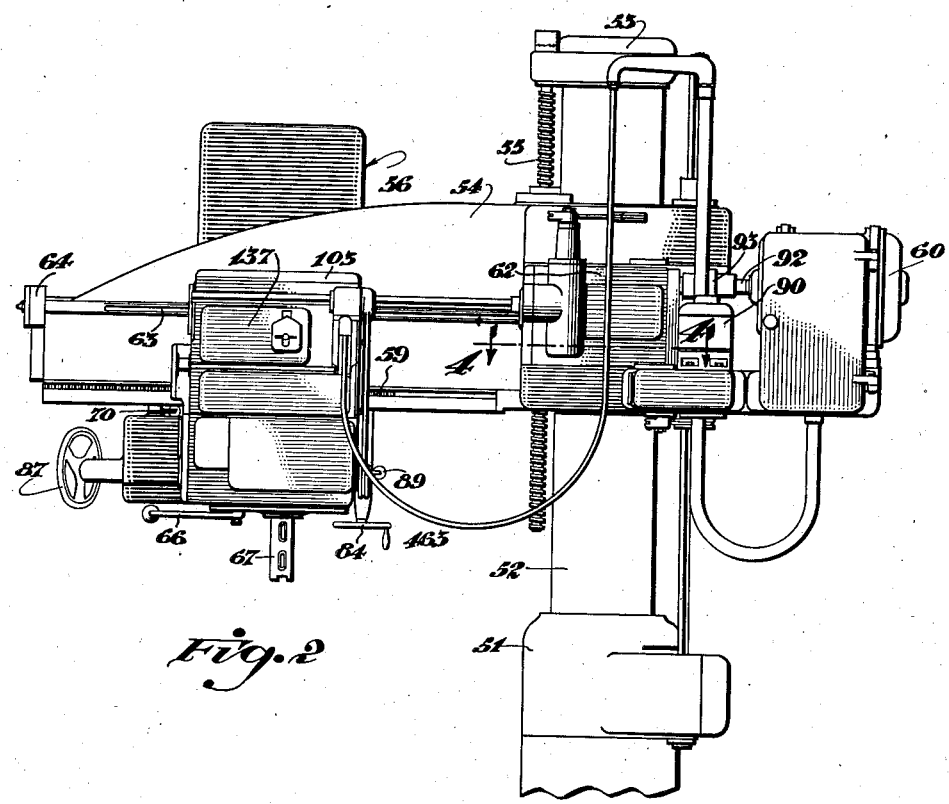
Figure 2 is a rear view of the radial drill with the base broken away.
Figure 3:
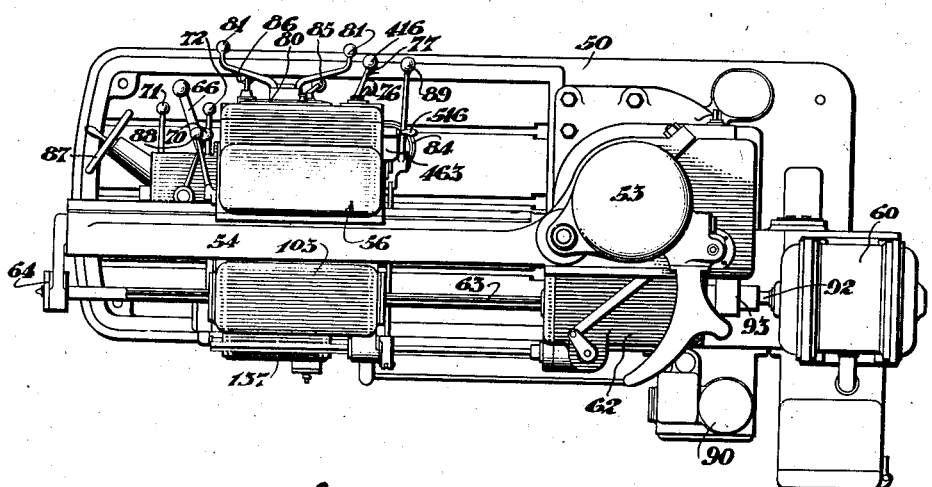
Figure 3 is a top plan view of the radial drill.

The general construction of the radial drill, in which the present improvements are disclosed, is as follows: A base 50 has a stump 51 rising from one end thereof. A column 52 is rotatably mounted on the stump and has a cap 53 attached to its upper end. An arm 54 is vertically slidably mounted on the column 52. This arm may be raised or lowered so as to place the arm in the proper position for locating the drill at the proper height, relative to the work. The work is mounted on the base 50. The arm is supported and elevated by means of a screw 55 depending from the cap 53 of the column.

A drill head 56 is slidably mounted for longitudinal movement on the arm 54, which projects radially from the column. For this purpose, the arm is provided with a rail 57 along its front face. A driven pinion 58 (Figure 4) engages a rack 59 fixed along the rear face of the rail. This pinion is rotated either by power or by hand through means disclosed and claimed in a co-pending application, Serial No. 291,110, filed August 21, 1939, now Patent No. 2,295,516, issued September 8, 1942.

The power for the drill is derived from an electric motor 60, mounted on the short end of the arm. The power is first directed through a shaft 61 into a gear box 62, containing arm elevating gearing and its control means, disclosed and claimed in a co-pending application. From the shaft 61, the power is carried without break to a splined shaft 63, which traverses the drill head and is supported at its outer end in a bracket 64 on the outer end of the arm. Within the drill head the power is taken from the shaft 63 through reversing clutches 65—65 (Figure 6) directly controlled by means of a main power control lever 66 for the drill head.

From the reversing clutches 65—65, the power is delivered to the spindle 67 through speed control gearing. The shifting of this gearing for change of speed is accomplished by means of lever operated cams 68, 69. The system provides for thirty-two speeds. A lever 70 (Fig. 15) provides for shift alternately to high and low ranges, Levers 71—72, movable with respect to a dial plate 73, shift the cams for shifting the appropriate gears in the selected ranges, as explained hereinafter.

Figure 31:
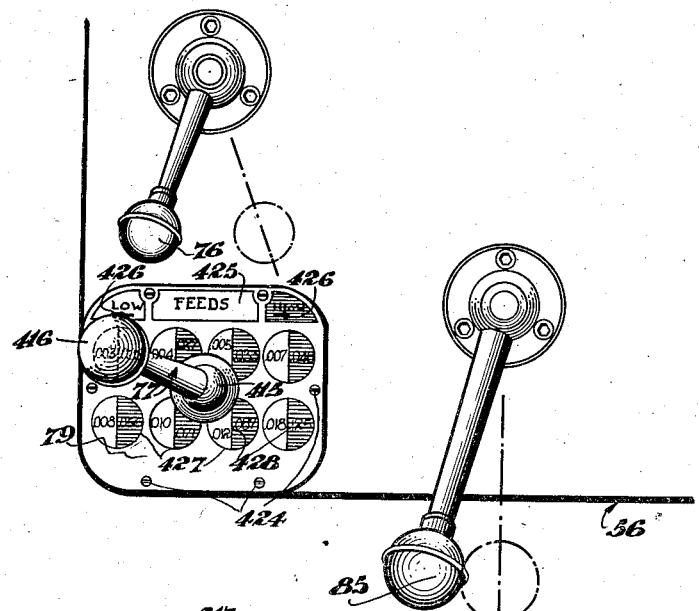
Figure 31 is a fragmentary front view showing a portion of the head illustrating the feed control dial and levers.
Figure 52:
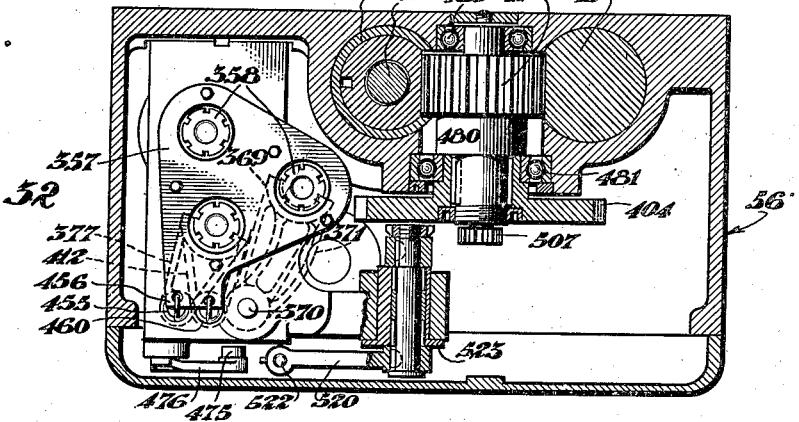
Figure 53:
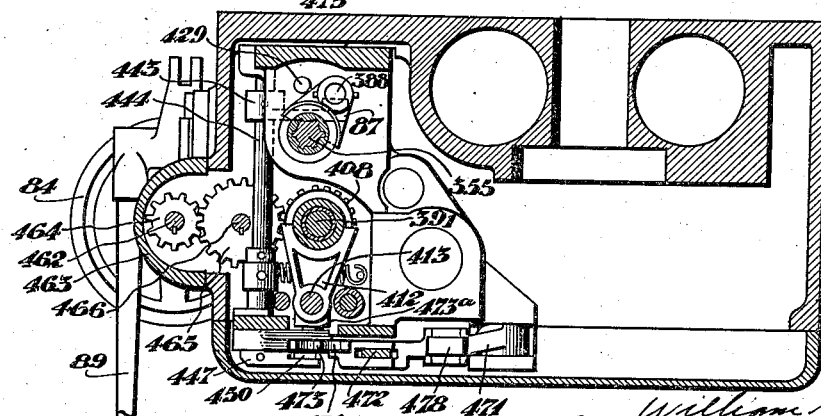

From the spindle the drive proceeds through feed change gears to a pinion 74 (Figure 21) engaged between the rack teeth of the spindle 67 and a counterweight 75. This feed gearing, providing sixteen feed changes, is controlled for these changes by means of levers 76—77 at the face of the head (Figure 31). The upper of these levers effects shift from low to high range, or vice versa. The lower lever 77, through a cam 78 (Fig. 22), accomplishes the changes in the respective ranges, as indicated on a dial 79.

Figure 30:
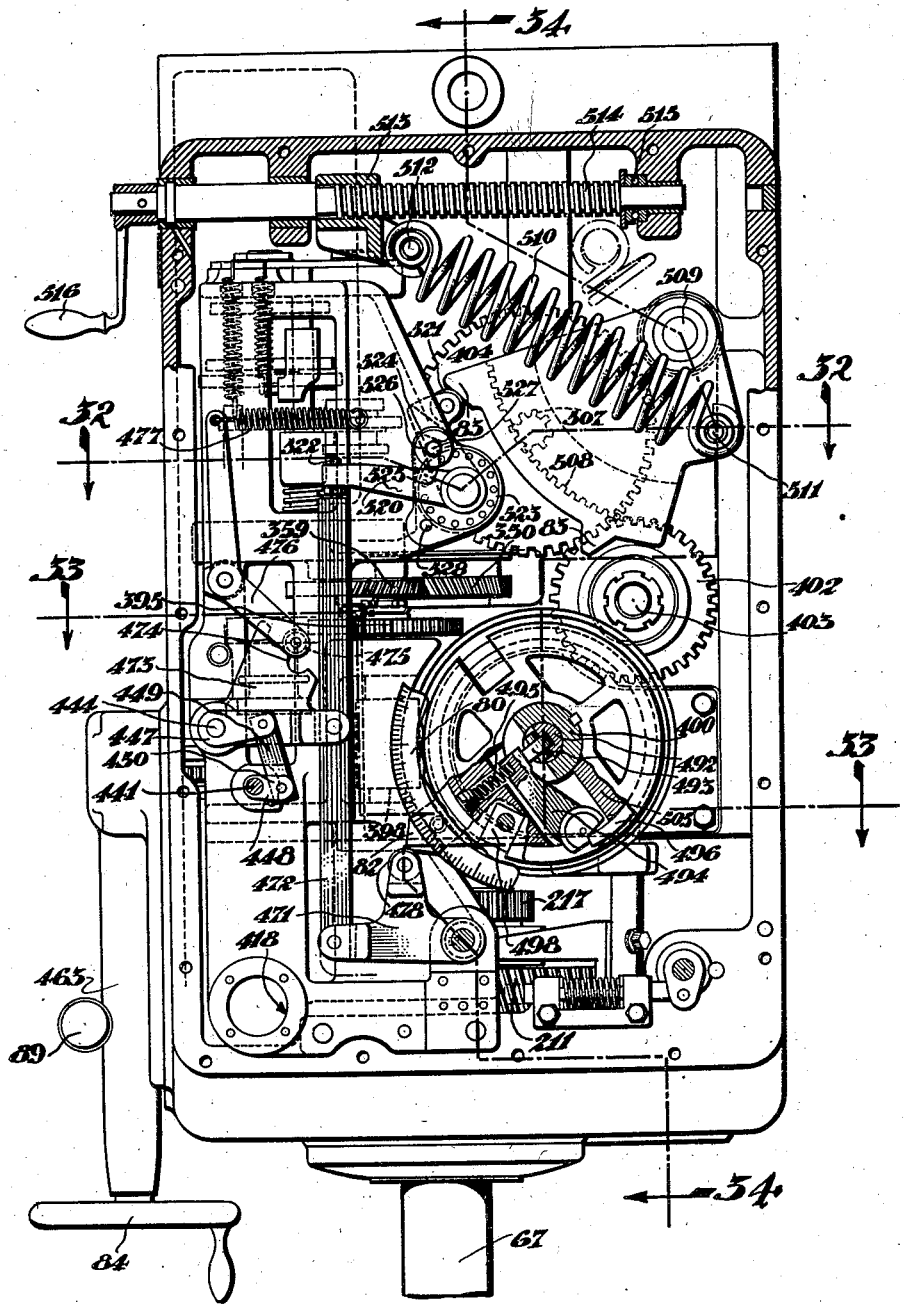
Figure 30 is a front view of the head, with the cover removed and portions broken away for illustrating the details of the feed mechanism for the spindle.

The amount of feed is controlled by means of a setting and indicator dial 80. The feed connection is controlled manually by means of levers 81—81 (Fig. 1), and automatically, by means of a dog 82 (Fig. 30). Dogs 83—83 on the variable counterbalance additionally control the spindle feed, keeping it within normal limits by automatically stopping the feed, regardless of the hand setting of the feed dial. A hand wheel 84 provides for manual feed. A lever 85 couples either the hand wheel or the power feed.

Power traverse of the head is controlled by means of a lever 86. A hand wheel 87 is provided for traversing the head by hand. A lever 88 operates the head clamp. Lever 89 controls the clamping of the arm to the column and the elevation of the arm. The column is clamped by means of an electric motor 90 on the arm. This motor is controlled by means of clamp and unclamp push buttons 91—91 on the head just below the speed indicator dial. Separate applications are co-pending, namely, Serial No. 297,722, filed Oct. 3, 1939 and Serial No. 291,110, filed August 21, 1939, now being respectively Patents Nos. 2,278,262, issued March 31, 1942, and 2,295,516, issued September 8, 1942, directed to the variable counterbalance mechanism shown in Figures 30 and 34, and the head traversing mechanism and other features of the radial drill disclosed herein.

*The power to the head*

The main electric motor 60 is bolted on the short extension of the arm. Its shaft 92 carries a coupling element 93 which is coupled with the extended arm of a power shaft bolted in gear box 62. The gear box at the other side thereof has a driving shaft 63 extending therefrom into connection with the head. Within the gear box 62 suitable elevating mechanism is employed, but since the elevating mechanism forms no part of the present invention, its details are not disclosed herein.

The head 56 includes a rear casing section 103 (Fig. 4) which houses the reversing gearing for the spindle, and part of the spindle driving transmission. The head generally described is of the conventional form, (Figure 4) that is to say, includes the rear casing 103, a front casing 104 in which the drill spindle is vertically disposed, and a lower transmission casing or extension 105 of the front casing, connecting the front and rear casings. The arm passes through the space thus provided between the front and rear casings. The rear face of the front casing includes the guide grooves and supporting means which engage upon the rail of the arm.

The splined shaft 63 passes through a long splined sleeve 106 (Fig. 6), the ends of which are journaled in bearings 107—107, carried by respective bearing brackets 108—108. These brackets have circular flanges 109 secured to the ends of the casing 103 by means of screws 110. The assembly of the sleeve in the bearings is maintained by means of washers 111, engaging the clutches against shoulders on the sleeve at the inner side of each clutch, and nuts 112 screwed on the ends of the sleeve and fastening the inner races of the bearings against the washers. The bearing brackets include felt packing rings 113 surrounding and sealing the ends of the sleeve. One of the brackets includes a removable bushing 114, providing access to one of the nuts 112, so as to permit removal of the nut 112 and withdrawal of the sleeve through the other end of the casing.

Reversing driving gears 115—115 are loosely rotatively mounted on the sleeve 106 toward the respective ends thereof. These gears in each instance are journaled on spaced bearings 116—116, fixed on the driving sleeve. Within each gear is a clutch 65. An element 117 of each clutch is keyed to the driving sleeve between the spaced bearings 116—116. This element supports a clutch ring 118, carrying a clutch band 119.

Figure 7:
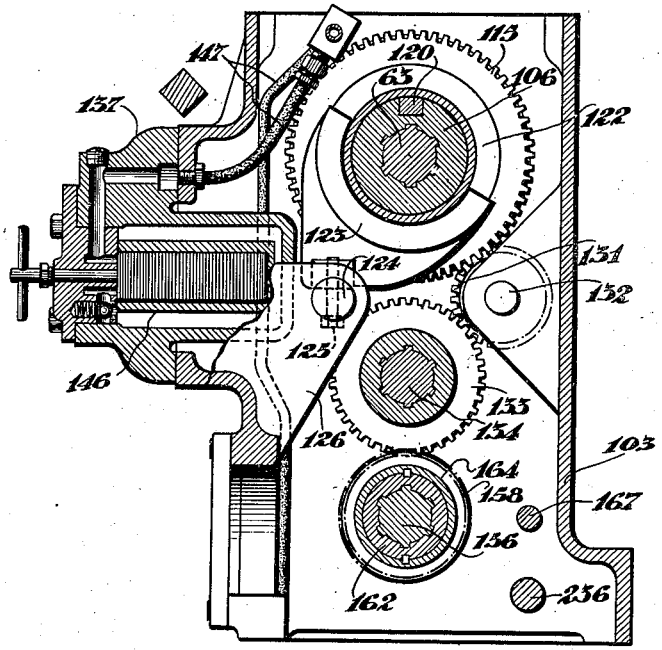
Figure 7 is a sectional view taken on line 7—7, Figure 6, further illustrating the transmission.

Since the clutches form no part of the invention described and claimed in this application, it is believed unnecessary to show and describe the clutch details. Generally described, a clutch actuating key 120, mounted in a keyway in the sleeve between the clutches, alternately actuates the clutches for connecting the gears to the splined shaft. This key 120 has feathered ends engaging under the ends of respective levers 121. These levers, when rocked, spread the clutch bands and cause them to grip the internal periphery of the gears. A yoke ring 122 encircles the sleeve and key centrally of the clutches and is fixed to the key so as to slide the key longitudinally when actuated. A yoke 123 (Fig. 7) engages in an annular groove in the yoke ring.

The yoke 123 is fixed on a shifter rod 124 by means of screws 125. The rod is slidably mounted in lugs 126 of the casing. A lever arm 127, bolted to the upper end of a vertical rod 128, has a ball and socket connection with one end of the shaft 124. The vertical rod 128 is journaled for rotation in an upper lug 129 and a boss 130 in the base wall of the casing. The long main control lever 66 (Fig. 13) is fixed to the extended lower end of the shaft 128 and has its knob end extended out to the front of the head just below the spindle speed shifter lever assembly. Accordingly, horizontal movement of the lever 66 controls the delivery and direction of power entering the drill head.

Figure 8:
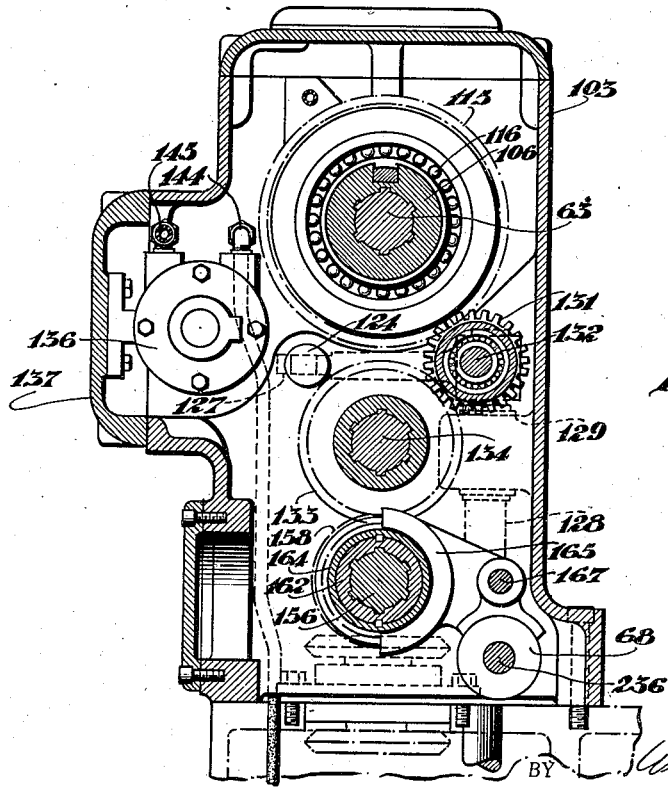
Figure 8 is a sectional view taken on line 8—8, Figure 6.

A reversing idler gear 131 is provided in mesh with one of the gears 115. This gear (Figs. 6, 7 and 8) is journaled on a short shaft 132 between spaced bearings of the casing. The power is transmitted from gear 115 through this gear, for the drill return operation, to gear 133, fixed on the splined shaft 134. For the feed and rotation of the drill in boring, a slow speed is obtained through the other gear 115, meshing directly with a large gear 135, fixed to the shaft 134.

The lubricant pump 136 for the head is fixed to a cover plate 137 in an opening in the back of the head. The pump shaft 138 (Fig. 5) extends into a driving sleeve 139, journalled in bearings 140 in spaced lugs 141 of the cover plate 137. The sleeve 139 includes a gear 142 meshing with driving gear 143, keyed to the driving sleeve 106. The pump has an intake conduit 144 extending up from the sump of the head casing, and an outlet tube 145 extending over to a filter 146, also fixed to the cover plate 137. Lubrication lines 147 extend from the filter to the various bearings of the head. Thus, all of the elements of the lubrication system are secured to the cover plate 137 and may be quickly removed as a unit.

Spindle drive

As stated, the gears 133 and 135 transmit rapid drill return movement and slower power or drilling movement respectively, as controlled by the main lever 66. They are fixed to the same shaft, namely, 134. Four speed changes are obtained in the upper or rear casing 103, and these four are stepped up to thirty-two speeds (20 R. P. M. to 1600 R. P. M.) in the lower casing of the head at the connection to the spindle.

In addition to gears 133 and 135, three other gears, namely 150, 151, and 152, large to small, are fixed to the splined shaft 134. These gears 133, 135, 150, 151, and 152 are held in a cluster on the shaft. End bearings 153 support the shaft 134 in the end wall and a central wall of the casing.

The shaft 134 includes an extension 154 between the central wall and the other end wall. This extension journals a gear 155, meshing with the gear 143 and forming part of the head traversing gear train, described and claimed in the co-pending application Serial No. 291,110, filed August 21, 1939, now Patent No. 2,295,516, issued September 8, 1942.

Figure 9:
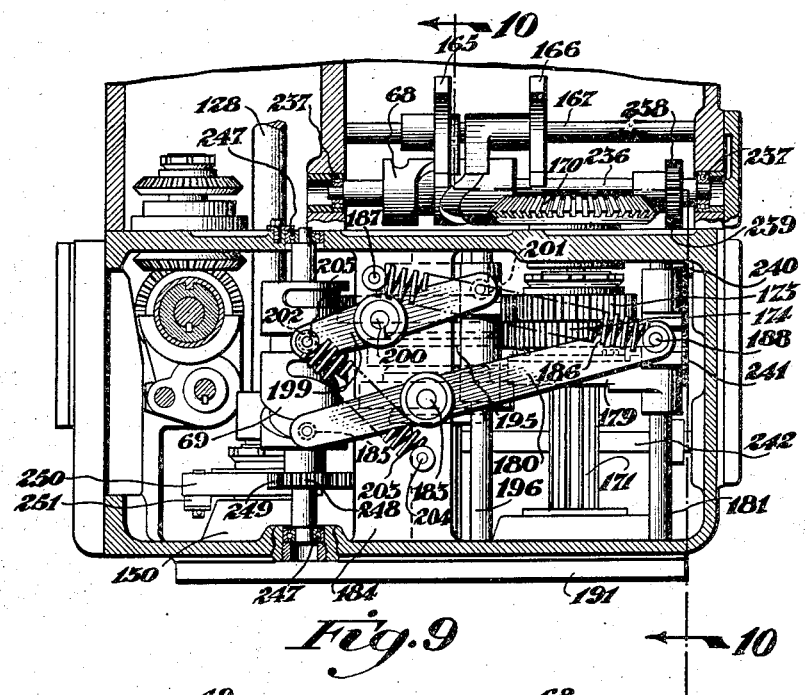
Figure 9 is a sectional view taken on line 9—9, Figure 4, showing a portion of the speed gear shifting means.
Figures 11, 12:
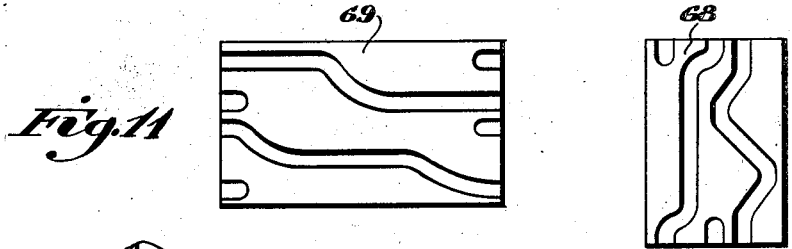
Figure 11 is a view illustrating a development of one of the speed gear shifting cams.
Figure 12 is a view illustrating a development of the other of the speed gear shifting cams.

Just below shaft 134 another shaft 156 is rotatably supported in bearings 157—157 in the end wall and central wall of the casing parallel with the shaft 134. This shaft is splined and carries shiftable gears 158, 159, 160 and 161 component to the gears 133, 150, 151, and 152. These gears are in independently shiftable sets of two gears each. In each instance one gear includes a hub 162, upon which the other gear of the set is held by means of a nut 163. The last named gears include annular grooves 164. These grooves 164 are engaged by shifter yokes 165, 166 (Figure 9). The yokes are slidably mounted on a rod 167 and are actuated by means of the cam 68. Each yoke includes a roller 168 engaged in a particular cam track, the arrangement of which is illustrated in Figure 12.

Figure 4:
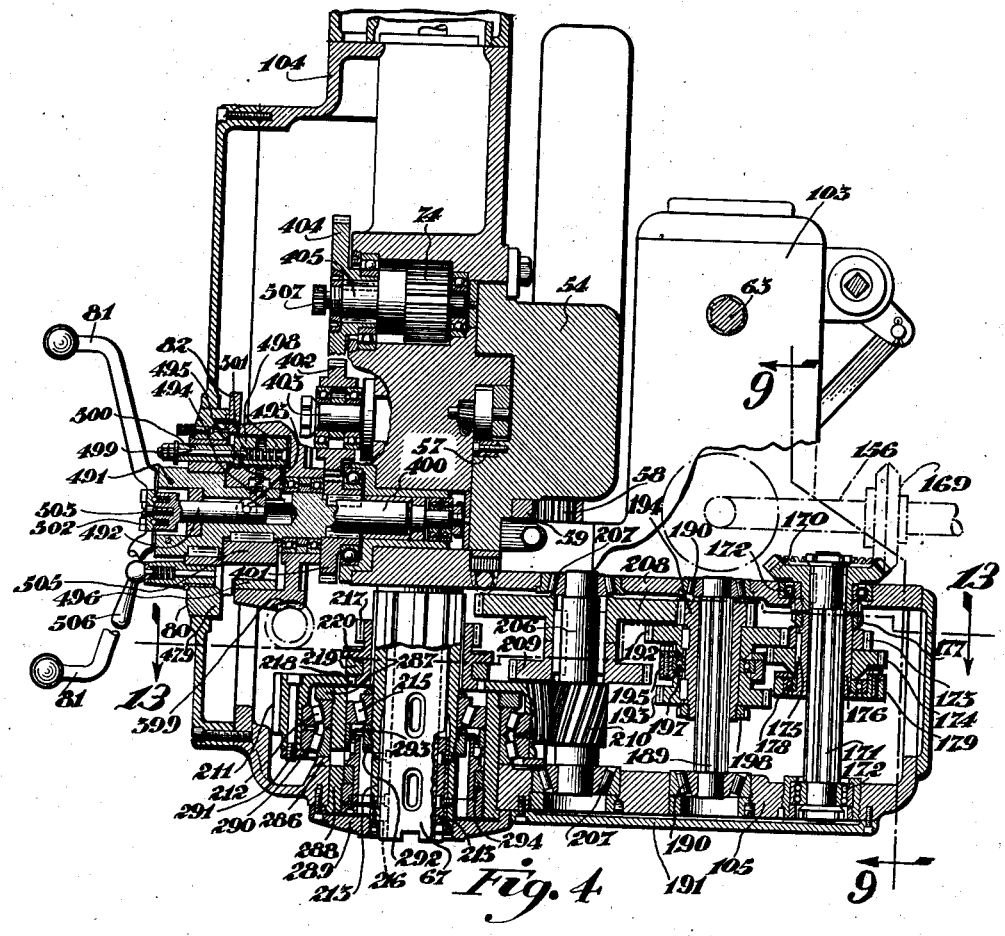
Figure 4 is a sectional view taken on line 4—4, Figure 1, illustrating the driving and feeding means for the spindle.

A bevel gear 169 is fixed to the shaft 156 and meshes with another bevel gear 170, fixed to the upper end of a vertical shaft 171. Shaft 171 is journaled in bearings 172—172 in the upper and lower walls of the lower casing 105 (Figure 4). The gear 170 is journaled directly in the upper bearing. A shiftable gear cluster consisting of gears 173, 174 is slidably mounted on the splined portion of shaft 171. The gears are held together rotatively by means of a key 175 on a headed sleeve 176. A nut 177 screwed on the sleeve binds the gears against the inner race of a ball bearing 178 engaged against the head. This gear cluster is shiftable to three positions.

The cluster of two gears just described is shifted by means of a yoke 179 (Figure 9) supported on one end of a pivoted lever 180. The yoke is slidably mounted on a fixed vertical rod 181 and provides a cross-slotted portion engaged by the roller 182 on the end of the lever. The pivot pin 183 for the lever is mounted in a lug 184 of the casing. The other end of the lever carries a roller 185 engaged in a track of the cam 69. A coil spring 186 disposed under pressure between a pin 187 on the lug 184 and the pin 188, carrying the roller 182, counterbalances the weight of the lever, the yoke, and the gear and permits easy shifting. The yoke carries the ball bearing 178 of the cluster and provides a connection in which the gear cluster may rotate and upon which the gear cluster is supported.

Another vertical shaft 189 is journaled in bearings 190—190 in the upper and lower walls of the lower casing. The lower bearings are accessible by removal of a cover plate 191 fixed on the base wall of the casing over an opening therein. A shiftable cluster of three gears 192, 193 and 194 is slidably mounted on the splined portion of the shaft 189. A yoke 195 provides for shifting of this cluster and is slidably mounted on a vertical shaft 196. The ball bearing 197 carried by the yoke for permitting rotation of the gears is fixed between gears 192 and 193 and these elements are held on the hub of and against gear 194 by means of a nut 198.

A lever 199 is pivoted on a pin 200 on the lug 184 and has a roller 201 at one end engaging a cross-slotted portion of the yoke 195. The other end of the lever carries a roller 202 engaging a cam track of the cam 69. A coil spring 203 under tension between a pin 204 on the lug 184 and the pin 205 carrying the roller 202 is effective for counterbalancing the weight of the gear cluster, the yoke, and the lever. Due to these springs 186 and 203, there is very little resistance to overcome in the operation of rotating the cam and shifting the levers.

Another vertical shaft, namely, 206 (Figure 4) is journaled in upper and lower bearings 207—207 fixed in the upper and lower wall of the lower casing. The lower bearing is accessible through cover plate 191. This shaft has three gears, namely, 208, 209 and 210 fixed thereto. These gears are not shiftable. The small gear 210 is in constant mesh with a bull gear 211 loosely journaled on a double roller bearing 212 on the axis of and around the lower end of the spindle.

A driving sleeve 213 for the spindle is supported and journaled in an upper roller bearing 214 in a lug of the casing and a roller bearing 215 adjacent the bearing 212. The spindle is in splined connection within this sleeve 213 by means of keys 216 and provides the conventional chuck for reception of the drill.

A cluster of two gears 217 and 218, is in splined connection with the driving sleeve 213 and is shifted by means of a yoke 219. These gears are integral and provide a sleeve portion having an annular groove 220. The yoke 219 engages the groove. The gear 218 is adapted to couple with the internal gear of the bull gear and the other, namely, 217, with the gear 208 for coupling either of these gears with the spindle.

Speed shift means

The yoke 219 includes a vertical lug portion 222 bolted to a vertical shift rod 223 slidably mounted in plain bearing lugs 224—224 in the casing (Figure 14). A bell crank 225 is pivotally mounted on a pivot pin 226. This bell crank carries a roller 227 adjacent the end of one arm. This roller engages a cross notch in the rod 223. The other arm of the bell crank has a connection with one end of a slide rod 228. The rod 228 is horizontally slidably mounted in the lugs of a control rod assembly housing or casing 229. The lever 70 is fixed to a vertical stub shaft 230 extending through the top wall of the casing or box 229. The inner end of the shaft carries a lever arm 231 having a pin 232 engaging a cross groove in the rod 228.

A coil spring 233, under tension between a pin 234 on the end of the yoke supporting arm of the bell crank and a pin 235 on the casing, counterbalances the gear cluster, the yoke and the rod, and takes the weight of these parts off the shifting means for the purposes described heretofore. Thus this gear cluster 217—218 has two positions accomplished by shifting the lever 70 alternately to low or high speed range (Figure 15).

Figure 10:
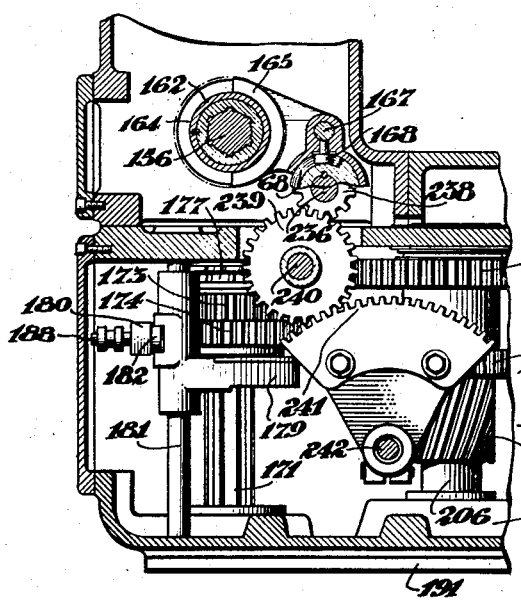
Figure 10 is a sectional view taken on line 10—10, Figure 9, showing the means for rotating one of the shifting cams.

The cam 68 is rotatably mounted, being fixed to a shaft 236 journaled in bearings 237—237. A gear 238 is fixed on one end of the shaft and is in mesh with a gear 239 (Figure 10) mounted on a stub shaft 240 fixed in the casing wall. This gear 239 is in mesh with a gear segment 241 attached to a shaft 242 extending across the casing and journaled in bearings 243—243 in its side walls. An arm 244 is fixed to the shaft at the end opposite the gear segment and is connected by a link 244a to a shifter arm 245 rotatively mounted on a shaft 246 journaled in the box 229 (Figure 16). This arm 245 is journaled on spaced ball bearings on the shaft 246 and carries the shifting lever 71 screwed into its forward side.

The cam 69 (Figure 9) is fixed on a shaft vertically disposed in ball bearings 247—247 in the upper and lower walls of the casing. A gear 248 is fixed to the cam shaft at its lower end and meshes with a gear segment 249 (Figure 13) journaled about the shaft 128 and includes an arm 250 to which a link 251 is attached. The other end of the link is connected to an arm 252 (Figure 16). This arm 252 is journaled on a shaft 253 on ball bearings 254—254 and includes a segment of bevel teeth 255 meshing with a bevel gear 256 mounted on and fixed to a sleeve 257 journaled on spaced ball bearings 258—258 on the shaft 246. The sleeve has the shifting lever 72 projecting radially therefrom.

The levers 71 and 72 project through respective vertical slots 259—259 in the face of the casing (Figure 15). These slots are spaced apart. The indicator plate 73 is fixed on the face of the casing and has shifting indicia disposed between the slots. Each slot includes a countersunk portion in which a sliding cover plate 260 is disposed for vertical movement as carried by the shifting lever passing through the plate.

The plate 73 carries all of the spindle speed indicia. The low speeds are indicated by enclosed white areas and the high speeds by enclosed black areas. As stated heretofore, the speeds are divided into these two ranges and the lever 70 controls the shift from one to the other. As indicated in Figure 15, the lever 70 has been moved to a position adjacent an enclosed white area 261 at the left hand portion at the top of the indicator plate having been shifted in the direction of the low speed arrow 262 in this panel. For high speeds, the lever is shifted to the right over the enclosed black area 263, including the arrow 264.

For indicating the speeds of the respective ranges, the indicia consists of a series of lines 265 drawn upwardly from the inner edges of the slots. These lines cross each other to form a series of diamond-shaped areas 266. These areas are divided into equilateral triangles by vertical lines 267. Those portions of the diamond-shaped areas on the right-hand side are black and those on the left-hand side are white. Both ranges of speeds read from left to right down each inclined row of diamond-shaped panels. Just below each lever and on the cover plates 260 is an arrow 268 pointing angularly upwardly in parallelism with the lines 265.

As the levers are set in the drawings, Figure 15, the speed of 20 R. P. M. is indicated since 20 R. P. M. is the only panel section toward which both arrows are pointed. The operator reads the white panels for the reason that the lever 70 is set in the low range of speeds. The operator may very quickly shift the spindle speed from 20 R. P. M. to 193 R. P. M., that is change from one range to the other by moving the lever 70 to the right into the high speed zone. The spindle will then be driven at 193 R. P. M., i. e., the arrows of the shifter levers 71 and 72 both point to the black areas indicating 193 R. P. M. Assuming the lever 70 to be in the low speed range, a shift can be made from 20 R. P. M. to 31 R. P. M. by moving the lever 71 downwardly into alignment with the last inclined row of areas at which point its arrow will point at 31. Also, as another example, the operator may shift from 20 R. P. M. to 109 R. P. M. by moving the right-hand lever 72 into alignment with its last inclined row of areas whereupon both arrows will point at 109 in this row.

As may be evident from the speed panel, thirty-two speeds are possible. Four speeds are delivered to shaft 156 through the four sets of gears. Thus, shaft 171 receives four speeds, shaft 189 eight speeds, shaft 206 sixteen speeds, and the spindle drive sleeve thirty-two speeds. Three positions are provided at shaft 171 (Figure 4), since the gears 173 and 174 may move either with the gears 192 and 193 or these respective sets of gears may be moved independently. When gear 192 is meshing with gear 209 and gear 174 with gear 193, gear 173 may be shifted to mesh with gear 192. Thus the speeds available at shaft 206 through gear 209 are eight. When gear 194 is in mesh with gear 208 and gear 193 with gear 174, gear 173 may be shifted one notch higher to mesh again with gear 192. Thus the speeds available at shaft 206 through gear 208 are eight making a total of sixteen speeds either passing through gear 210 to the bull gear 211 to the spindle, or through gear 208 through gear 217 to the spindle for a total of thirty-two speeds.

The drawings show the system effective for delivering the lowest speed to the spindle, namely 20 R. P. M. (see Figure 15). To produce the mesh of gears necessary for this speed, the levers are set as indicated and the cams rotated so as to shift gears into the following meshing arrangement. The upper cam 68, actuated by shift lever 71, shifts gear 161 into mesh with gear 152 leaving the other cluster of gears 159, 160 in neutral (Figure 6). Gear 194 is engaged with gear 208 (Figure 4) by means of the lower cam 69 through lever 180 actuated by shift lever 72. Lever 72, also through the lower cam, actuates gear 173 to cause it to mesh with gear 192. Lever 70 has moved gear 218 into coupling engagement with the internal gear of the bull gear. It is not believed necessary to trace out each of these shifts.

The operator may jump the speed from 20 R. P. M. to 1600 R. P. M. if desired. In this event, rotation of the upper cam 68 shifts the gear 158 into mesh with the gear 133 (Figure 6) and maintains the other cluster of gears 159, 160 in neutral. The other cam 69 is effective for moving gear 192 into mesh with gear 209 and gear 174 into mesh with gear 193 (Figure 4). At the same time, the range control lever 70 has been moved to the high speed range which uncouples the bull gear from the spindle and connects the spindle through gears 208 and 217.

Now, each of the shift levers 70, 71, and 72 are provided with detent means for accurately establishing the various positions. Lever 70 has only two positions, that is, low or high speed. The shaft 230, to which this lever 70 is connected, carries a detent arm 270 providing two detent grooves 271 in its end. A roller 272, carried by a swinging pivoted detent arm 273, is held against the end of the arm containing the detent grooves by means of a coil spring 274 under tension between the roller carrying end of the arm and a stud 275 fixed to the casing. Thus, the roller may snap into either one of the grooves for definitely fixing the predetermined shifted position of the lever 70.

The lever 72 provides four positions, each of which is adapted to place the transmission in four different speeds dependent upon the position of the other lever 71 which also has four positions. For this purpose, the gear (Figure 18) actuated by the lever 72 includes a flange 276 providing four detent grooves or notches 277. A bell crank 278 is pivotally mounted in the casing on a pivot pin 279. One arm 280 of this bell crank carries a roller engaging the notches successively and the other has its end connected to a lug 281 of the casing by means of a coil spring 282 under tension, effective for urging the roller 283 against the grooves.

The other lever 71 has its operating arm provided with a series of four notches engaged by a detent means of the same nature as that just described. Thus, the two levers 71 and 72, providing four positions apiece, provide sixteen positions in all and these sixteen positions are doubled by means of the lever 70.

The casing, which carries the levers and dial, also carries the hand wheel 87 for hand traverse of the head along the arm and the control switches 91, 91 for the column clamp.

The driving sleeve 213 for the spindle is journaled in the upper roller bearing 214 in the lug of the casing and the roller bearing 215 adjacent the double bearing 212. The spindle 67 is in splined connection within this sleeve by means of keys 216 and provides the conventional chuck for reception of the drill. The double bearing 212 is supported on the boss 286 of the lower wall of the casing and held there by means of a collar 287 engaging the top of the bearing. This collar 287 is screwed on a sleeve 288 disposed in the boss and has a headed lower end seated in a countersink in a cover plate 289 which encircles the lower end of the driving sleeve. A ring 290 is secured by bolts 291 to the under side of the gear and holds the gear on the bearing. The driving sleeve rests on the bearing through a shoulder. A nut 292 on the sleeve engages the bearing against the shoulder and secures the packing 293 in place. Additional packing, shown generally at 294, seals the spindle driving means for preventing leakage of oil from the head.

*Spindle feed transmission*

Figure 21:
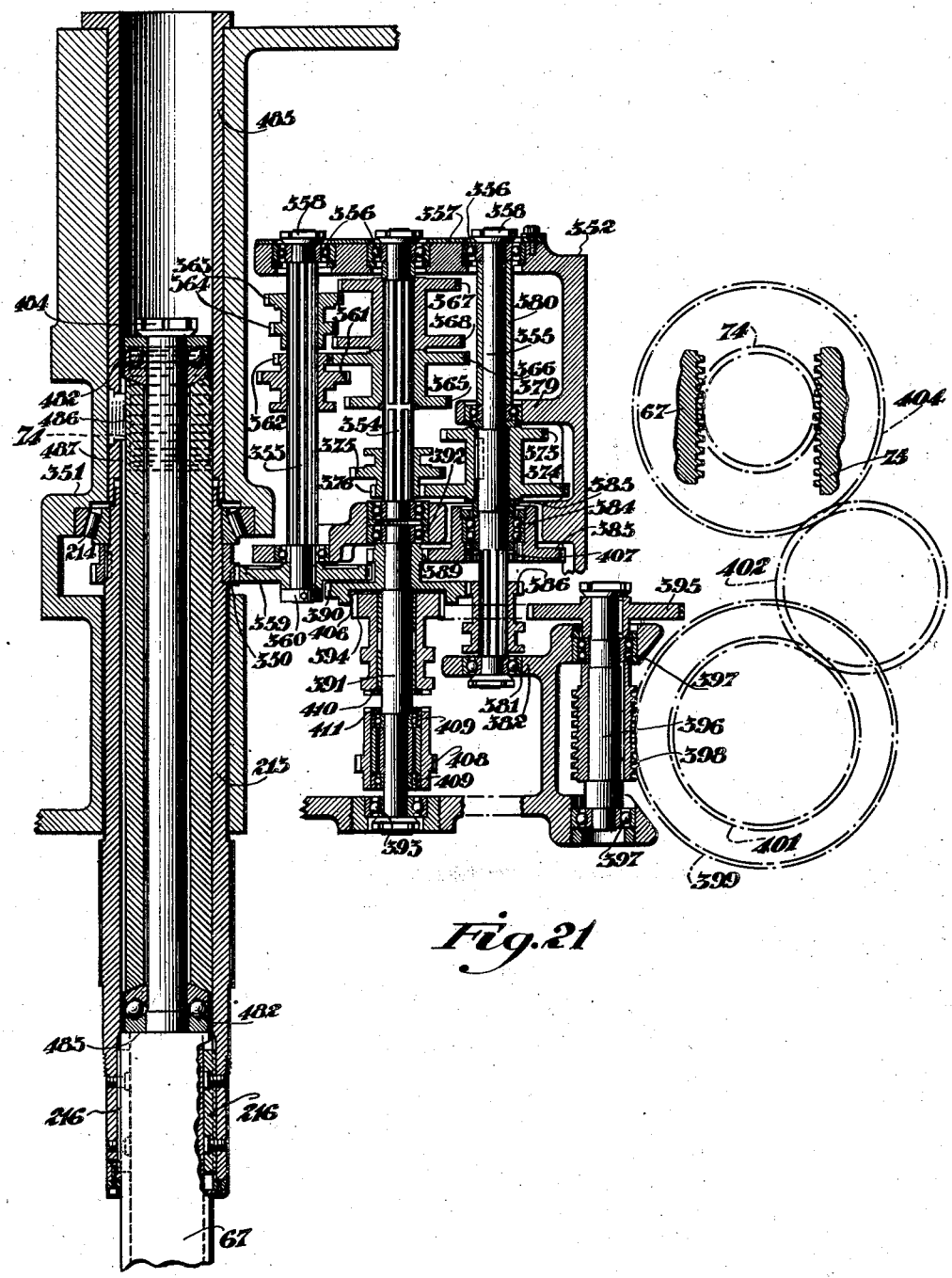
Figure 21 is a sectional layout view showing the gear arrangement for feeding the spindle.

The feeding movement for the spindle is taken from the rotative movement of the spindle starting from a gear 350, fixed to the sleeve between a shoulder of the sleeve and the bearing 214, secured in a circular recess in the underside of the casing lug 351, Figure 21. The upper end of the spindle is counterturned and rotatively engaged within the vertically slidable non-rotatable rack sleeve 75, the teeth of which are in mesh with the feed gear 74.

The feed transmission gear change unit, Figure 21, is supported in a bracket 352, attached to the back wall of the main head casing and is accurately positioned for driving engagement with the gear 350 when secured. As stated heretofore, this transmission develops sixteen feed changes. Three splined shafts are employed, namely 353, 354, and 355. Each is journaled vertically in bearings 356 at the top and bottom fixed in upper and lower extensions of the bracket 352 and held in position by means of nuts 358 and the plate 357 at their upper ends.

The first shaft 353 has the gear 359 fixed to its lower end below a flange of the bracket and sustained by means of a collar 360. Two slidable gear clusters are provided on this shaft 353 consisting of gears 361, 362 and gears 363, 364 respectively. The second shaft, namely 354 has two gear clusters fixed thereto. One consists of gears 365 and 366 component to gears 361 and 362 and the other, gears 367, 368, component to gear 363 and 364.

Gears 363 and 364 are shifted to either of two positions by means of a yoke 369, Figure 20 engaging in an annular groove in the gear cluster and fixed to a shift rod 370. Gears 361 and 362 are shifted by means of the yoke 371 engaging in an annular groove in the gear cluster and fixed to the tubular shift rod 372 in which rod 370 is telescopically engaged. Thus four speeds may be imparted to shaft 354.

The third shaft, namely 355, has a gear cluster fixed thereto consisting of gears 373 and 374. A gear cluster consisting of gears 375 and 376, component to gears 373 and 374, is slidably mounted on shaft 354. This gear cluster is shifted by means of a yoke 377, Figures 22 and 25, fixed shift rod 378. Shaft 355 is journaled in a lug 379 of the frame 352 above the gears 373 and 374. A sleeve 380 is disposed between the bearing at the top of the shaft and the bearing in lug 379. The extreme lower end of the shaft 355 is journaled in a bearing 381 in a lug 382 near the lower end the bracket 352.

A gear 383 is loosely rotatably mounted on the shaft 355 just below the gear clusters 373, 374. This gear includes a heavy hub and is supported on a double ball bearing 384, the inner race of which is fixed between a shoulder on the shaft and a sleeve 385 engaged against the lower end of the gear clusters 373, 374.

Just below the gear 383, a gear 386 is slidably mounted on the splined portion of the shaft 355. This gear is shifted from one feed range to another by means of the lever 76 disposed at the front of the head for this purpose. A yoke 387 fixed on a slide rod 388, Figure 24, engages an annular groove in this gear 386 and is operated by the lever 76.

The gear 383 is in constant mesh with a gear 389 of the gear cluster 389, 390. This gear cluster is rotatably mounted on a shaft 391 having its upper end journaled in the ball bearing 392 in an extension of the bracket 352 and lower end journaled in a ball bearing 393 in lower wall of the bracket. This shaft is in alignment with the shaft 354. A shiftable gear 394 is mounted on the shaft 391 and is in constant sliding mesh with a gear 395.

The gear 395 is fixed to a shaft 396 journaled in upper and lower bearings 397 in the bracket. A worm 398 is fixed to the shaft between bearings and meshes with the worm wheel (Figures 21 and 30). This worm wheel is disposed on a shaft 400 (Figure 4) and, through a clutch, drives the gear 401 meshing with the gear 402 on another shaft 403. The gear meshes with a large gear 404 fixed to the shaft 405 carrying the gear 74.

Thus it will be seen that the high and low range feeds to the spindle are imparted by shifting the gear 386 to engagement with either the internal teeth 407 of gear 383, or, as shown, for the low range of feeds, with gear 390. For the high range of speeds the drive comes from shaft 355 through gear 386 to the internal teeth 407 of the gear 383 to gear 389 and through its internal gear teeth 406 to gear 394 which is in slidable mesh with gear 395. For the low range the gear 386 is connected directly to the gear 390 and through its internal teeth 406 to gear 395.

Now, on the shaft 391, another gear 408 is loosely mounted on spaced ball bearings 409. This gear, as will be explained hereinafter, is in mesh with the hand feeding means. The shiftable gear 394 has clutch teeth 410 at its lower end adapted to mesh with clutch teeth 411 of the gear 408. This gear 394 includes an annular groove engaged by a yoke 412, which is mounted on a rod 413 slidably supported in the bracket 352. The yoke 412 is shifted from power couple to hand couple through the lever 85 at the front of the head.

The shaft 354 may be driven at four different speeds and the shaft 355 at eight. Two ranges of eight speeds each are provided at the shaft 391 by shifting of the gear 386. Thus, it will be seen that sixteen feed changes may be imparted to the spindle.

*Spindle feed shift means*

The lever 77, Figures 22 and 25, includes a ball 415 midway of its length. It has an operating knob 416 at its outer end and a coupling knob 417 at its inner end. This ball 415 is mounted for universal movement in a socket 418 disposed through the front cover plate 419 of the head. The socket is split, consisting of two elements held together and to a lower extension 420 of the bracket 352. These elements 421 of the socket are disposed in an opening in the cover plate 419 and carry a packing ring 422 encircling the ball.

The feed indicator plate 79 is attached to the face of the cover plate about the lever 77 by means of screws 424. This plate carries the following indicia: Across its upper portion the two ranges are indicated. The central panel 425 indicates generally the subject matter of the panel, namely "Feeds." At each side of the upper panel, arrows 426—426 pointing in opposite directions indicate low feeds at the left-hand panel and high feeds at the right-hand panel side. Since the shaft to which the range control lever is attached is on an axis above and in vertical alignment with the ball and socket mounting of the lower lever, it will be seen that this lever, since it depends to a point adjacent the indicator panel, will lie substantially immediately above these range indicating panels. Its effective position, therefore, can be easily determined by glancing at the indicator plate.

The central portion of the panel is white with the exception of circular areas 427 of which there are upper and lower rows horizontally disposed above and below the axis of revolution of the ball. There are four circular areas in each row and each is split by a vertical line 428. The feeds indicated in the left hand portions of these circular areas, are the low range, those in the right, the high feeds. In other words, the low range is from .003 to 0.18 and the fast from .022 to .125. These figures indicate the amount of feed in inches per revolution of the spindle. Now, observing Figure 31, it will be noted that the manipulating knob 416 of the feed control lever will lie directly in front of a respective circular area for each position. This knob moves in two horizontal planes and may be shifted from one to the other at any point in its lateral swing. In the position shown in the drawings, the lever is effective at feed .003 since the lever 76 is in the low range.

The lever 77 operates the cam 78. The main portion of the cam 78, Figures 22 and 28, is essentially in the form of a segment of a cylinder. This segment is axially mounted on a shaft 429 journaled in the flanges of the bracket 352 so that its forward face, which includes the cam tracks 430, may swing with respect to various yoke actuating elements. The connection between the lever and the cam provides for horizontal and vertical shifting of the lever without disturbing the operative couple between these parts. Toward this end, a stud 431 is vertically slidably disposed in a boss 432 at the outer end of the cam and has a headed slotted lower end 433 in which the ball 417 of the lever is disposed. The headed lower end of this stud also includes an annular slot 434 engaged by a yoke, fixed to the lower end of the shift rod 378 carrying the yoke 377 for shifting the gears 375 and 376. Since the cam 78 has four lateral or horizontal positions, a detent means is provided for establishing four definite positions. The cam includes a plate or bar 435 fixed across its upper surface having four grooves in its feed edge. A pivoted arm 436 carries a roller 437, engaging these grooves. The arm is pivoted on a pin 438 fixed in the bracket 352. A coil spring 439, under tension between the outer end of the arm and a pin 440 of the bracket, constantly urges the roller against the grooved edge of the bar.

The range shifting lever 76 is fixed to an operating shaft 441 journaled in a bearing bracket 442 in the front cover 419. The slide rod 388, which operates yoke 387, is vertically operated by means of an arm 443 fixed to a shaft 444 leading to the front of the head. Since this range changing yoke has two positions (Fig. 24), the rod 388 includes two grooves 445 spaced apart a correct distance, engaged by spring urged detent balls 446 in the bracket. At its forward end, the shaft is attached to the operating shaft 441 of the lever 76 by means of arms 447—448 on the respective shafts connected by a link 449 (Figure 30).

The shaft 378, controlling the cluster of gears 375 and 376 has two positions and these are determined accurately by means of a detent 451 consisting of a spring urged detent lever 452 (Figure 23) loosely mounted on the shaft 444 carrying a roller 453 engaging either one of a pair of arcuate cross notches 454 in the side of the rod 378. The weight of the gears 375 and 376 and the shifting elements is counterbalanced by means of a coil spring 455 under tension between the upper end of the rod and an extension 456 of the plate 357 on the gear bracket.

The rods, which shift the upper cluster of gears, are telescoped (see Figure 27). In other words, the rod 372 is tubular and is traversed by the rod 370. The lower end of each of these shifting rods carries a collar 457 including a pin 458 engaging the particular cam track. A coil spring 459, disposed under compression between the yoke 371 and the bracket, counterbalances the weight of the yoke 371, rod 372, and gears 361 and 362. A coil spring 460 under tension between a pin 461 of the yoke 369 and the frame, counterbalances the weight of yoke 369, rod 370, and gears 363 and 364.

The spindle is raised and lowered manually by means of the hand wheel 84 fixed to the lower end of a shaft 462 in a vertical boss or bracket 463 fixed to the side of the head. The upper enclosed end of the shaft carries a gear 464 in mesh with a second gear 465 on the shaft 466 carried by this bracket. This latter gear meshes with the gear 408 (Figures 21 and 33).

Figure 34:
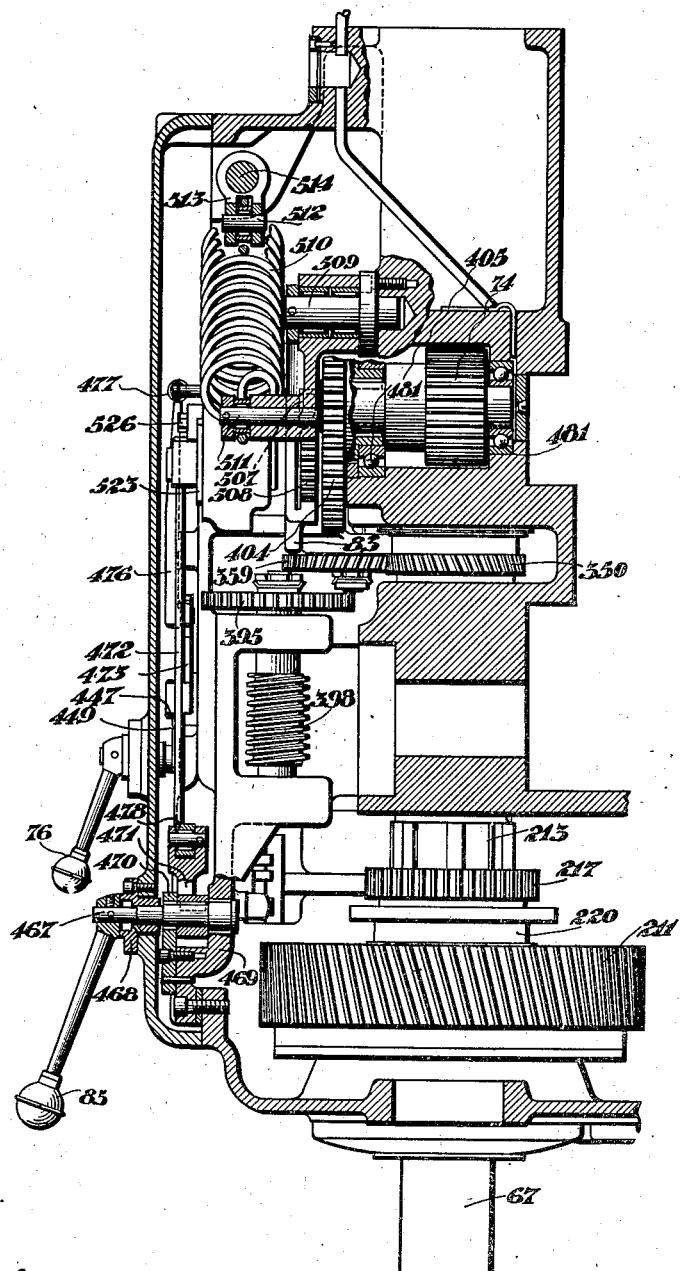
Figure 34 is a sectional view taken on line 34—34, Figure 30, illustrating more of the details of the head, including the spindle counterweight and the main feed control levers.

The shifting of gear 394 transfers from power to hand coupling, or vice versa. The return to neutral is accomplished either manually or automatically by power. Manual shift takes place through the lever 85, as shown in Figure 34. This lever is fixed to a rod 467 passing through a bushing 468 in the front cover plate and additionally journaled in a roller bearing in a lug 469 of the bracket carrying the feed gears. Additionally, the shaft is journaled in a plate 470, fixed to the bracket intermediate the cover and the rear bearing.

An arm 471 is fixed to the rod between its rear bearings. One end of this arm is connected to a link 472 extending upwardly back of the front cover plate. This link 472, intermediate its length, is pivotally connected to the outer end of the arm 473, which is rotatably mounted on shaft 444. This arm actuates the yoke 412 through a roller 473a affixed to its rear face and engaging the cross slot of the yoke 412, which shifts the gear 394. The arm 473 includes detent notches 474 for power or hand couple positions. These are engaged by the roller 475 of a detent lever 476, spring urged against the grooves or notches by means of a coil spring 477 under tension between the outer end of the lever and the bracket. It can be seen from the foregoing description that the change from power to hand traverse may be accomplished manually.

Now, the adjustable rotating dial element 479 of the feed includes a dog 82 which may be set for interrupting the feed at the desired time. This dog is adapted to engage a roller 478 carried by the arm 471 connected to the feed coupling and uncoupling means. The dog is effective for shifting this means to a neutral position intermediate the detent notches. At this point, the feed will stop. The feed is also interrupted automatically at the upper and lower limits of spindle travel by means carried by the counterbalance mechanism hereinafter described.

Referring to Figure 34, the gear 74, which meshes with the rack 67 of the spindle, is assembled on a shaft 405 carrying the gear 404 fixed on its forward end. This assembly is mounted in front and back bearings 481—481. The rack 67 is cylindrical (Figure 32) and is disposed upon a counterturned upper portion of the spindle between upper and lower thrust bearings 482. The lower bearing rests upon a shoulder 483 of the spindle. The assembly of bearings and the rack sleeve is held against this shoulder by means of a nut 484 screwed on the upper end of the spindle.

A sleeve 485 is fixed in a bore of the head casing supporting the spindle and includes a key 486 disposed in a longitudinal keyway 487 of the rack sleeve. Thus, the spindle may rotate within the rack sleeve and the rack sleeve is provided with thrust bearings taking the thrust of the feed as the rotation takes place.

The amount of feed for a given operation is controlled by means of the adjustable rotating dial element 479 providing a dial face 80 at the front of the head, the graduations of which move with respect to an indicator point 489 (Figure 1). This adjustable dial element is rotatably adjustably mounted on the enlarged forward end of the shaft 400. The shaft carries the gear 401 as a part of the feeding gear train. This shaft carries a clutch which is effective for coupling the worm wheel 399 to the shaft 400 and, therefore, the rack gear 74.

The clutch is actuated by means of diametrically extended hand levers 81—81 pivotally mounted on pins 491 of the shaft 400. The levers provide forwardly projected manipulating knobs whereby the operator may clasp either lever and, by pulling the same outwardly, engage the clutch. The clutches are of the self-maintaining type, that is to say, once the levers have been swung into clutch engaging position, the clutch will stay in until manually released.

The inner ends of the levers beyond the radially inwardly projected lugs are flexibly connected to the outer end of a clutch actuating rod 492. The clutch shifting rod 492 is slidably mounted in a central bore in a shaft 400. This shifting rod 492 carries a roller 493 disposed on a substantially diametric axis, disposed in a longitudinal slot or keyway in the internal bore of the shaft 400. The roller engages the inclined cam surface on the end of a clutch actuating lever 494.

The lever 494, pivoted at its outer end, is held downwardly against the roller by means of a coil spring 495. The outer end of the lever is formed for engagement with an end of the split clutch ring 496. The other end of the split clutch ring is pointed and the receding surfaces of the bluntly pointed end engage corresponding surfaces of adjustment elements 498. These elements 498 are adapted to be adjusted toward and from these receding surfaces by means of a rod 499 extending to the front of the dial through a sleeve 500. Tightening or loosening of the nuts on the forward end of this rod 499 draws the adjustment elements closer together or permits separation thereof under the influence of a coil spring 501.

The outer end of the clutch rod includes a locking disc 502, rotatably mounted thereon on a screw 503, extending axially into the end of the rod. This locking disc, when turned to a position determined by detents in the end of the rod, prevents engagement of the clutch by preventing inward movement of the levers 81. The element 505, carrying the clutch ring is keyed to the shaft 400. The worm wheel 399 is loosely journaled on the shaft 400 on spaced ball bearings and houses the clutching arrangement just described. The adjustable dial element 479 is fixed to the shaft 400 after adjustment by means of a clamping device 506.

As heretofore stated, the head includes an adjustable counterbalance adapted to accommodate for variation in the weight of the tools carried by the spindle. This counterbalance acts upon a gear 507, fixed to the outer end of the shaft 405, carrying the rack gear. A segmental internal gear 508 meshes with the gear 507 and rotates on a stud 509, fixed to the casing and providing a double roller bearing support for the segmental internal gear. A heavy coil spring 510, under tension between a stud 511 of the segmental gear and an adjustable stud 512 applies the counterbalancing force. The adjustable stud 512 is disposed transversely through the bifurcated lug portion of an element 513 adapted to be traversed by means of a screw rod 514 rotatably mounted in three spaced bearings at the top of the head casing. An end thrust bearing 515 is disposed between a washer engaging a shoulder of the screw rod and one of the lugs. This bearing receives the thrust occurring through the pull of the counterbalancing spring. A crank handle 516 is pinned to the forward end of the screw rod at the side of the head casing.

In the position shown in Figure 30, the counterbalance is set or adjusted to counterbalance a heavy boring tool. The dot and dash lines show its position when set to counterbalance the spindle when no boring tool is contained in the chuck. Since this counterbalance does not form a part of the invention but is claimed in the separate application, Serial No. 297,722, filed October 3, 1939, it is believed unnecessary to describe the details of its structure and operation here.

The gear segment carries a pair of circumferentially spaced lugs 83 which, by engagement with an uncoupling lever 520, limit the range of movement of the spindle. The lever 520 includes two arms, one of which carries a roller 521, adapted to be engaged alternately by the lugs 83. The other arm includes a set screw 522 adapted to engage the upper end of the link 472, which moves the gearing into neutral for stopping spindle feed.

The lever 520 is mounted on an eccentric bearing 523. This bearing may be moved to adjust, in assembly of the head, the lever which causes the automatic discontinuance of spindle feed at predetermined limits. The eccentric bearing is adjustable by means of a spanner wrench and is fixed in position by means of a disc 524, carrying a pin 525 engaging in any one of the holes adapted to receive the spanner wrench and held in fixed position by means of a nut 526. This disc includes a stud 527 engageable in either one of a pair of apertures 528. These apertures are located so as to provide for a very fine adjustment since the bearing may be adjusted half the distance between the spanner holes and the disc shifted to the other aperture 528 where its pin 525 will engage an adjacent spanner hole.

Certain of the subject matter of this application is shown in my previously filed application, Serial No. 233,448, filed October 5, 1938, now Patent No. 2,330,426, issued September 28, 1943.

Having described my invention, I claim:

1. In a radial drill having, a drive shaft and a drill spindle; a variable speed transmission for said spindle comprising, a cluster of three gears, means for shifting said cluster into two positions, gear clusters component thereto and means for shifting one of said gear clusters either into two intermesh positions relative to said cluster of three gears or shifting the same unitarily with said cluster of three gears when said cluster of three gears is shifted.

2. A transmission for radial drills or the like, comprising, a drive shaft, a driven shaft, an intermediate shaft, a cluster of three gears slidably mounted on said intermediate shaft for movement to two positions, a cluster of two gears on said driven shaft, a cluster of two gears slidably mounted on said drive shaft for movement to three positions whereby two of the gears of the cluster of three may be alternately meshed with the gears of the driven cluster and the cluster of drive gears may be alternately meshed with two of the gears of the cluster of three gears in either position of the cluster of three gears.

3. A transmission for radial drills or the like, comprising, a pair of shafts, a shaft intermediate said shafts, a cluster of three gears slidably mounted on said intermediate shaft for movement to two positions, a cluster of two gears on one of said pair of shafts, and a cluster of two gears on the other of said pair of shafts, said cluster of three gears shiftable to two positions for alternately meshing with said gears of the first cluster of two, and the second cluster of two gears shiftable to three positions of mesh with the gears of said cluster of three gears, two of which shifts may be unitary with the cluster of three gears and the other of which is relative to said cluster of three gears.

4. In a radial drill, a shaft, a cluster of three gears on said shaft, means for shifting said cluster into any one of three positions, adjacent shafts, gear clusters component to said cluster of three gears on said shafts, and means for shifting one of said gear clusters into either one of two intermesh positions relative to said cluster of three gears or shifting the same unitarily therewith into either one of two positions relative to the other of said component gear clusters.

5. In a spindle driving apparatus including a variable speed transmission having vertical shafts, a shifting lever for shifting from low to high speed range, a cam having lever and yoke connections to the respective gears, springs counterweighting the gears, and a lever for rotating said cam for shifting a plurality of gears simultaneously.

6. In a spindle driving head a set of horizontally shiftable gears, a cam for shifting said gears, a lever for operating said cam, a set of vertically shiftable gears driven by said first set of gears, springs respectively sustaining said last-named gears, a cam for shifting said last-named gears, a lever for operating said cam, range change gears for connecting said last-named set of gears to the spindle, and a range change lever for shifting said range change gears.

7. In a drill head for a radial drill, including the drill spindle, a casing providing a lower compartment and a rear upper compartment, a driving transmission for the spindle, including horizontal shiftable gears in the rear upper compartment and vertically shiftable gears in the lower compartment, a horizontally mounted cam for shifting the gears in the rear upper compartment, a vertically mounted cam for shifting the gears in the lower compartment, and means for rotating said cams.

8. A spindle driving transmission, including a casing having a spindle assembly therein, said casing including a lower compartment and a rear upper compartment, a gear transmission extending through the compartments to the driving spindle, a series of horizontally shiftable gears in the upper compartment, a cam mounted on a horizontal axis for shifting said gears, a series of vertically shiftable gears in the lower compartment, a cam mounted on a vertical axis for shifting said last-named gears, shifting levers extending from the last-named cam to the last-named gears, and counterbalancing springs attached to said levers for supporting the weight of the gears.

9. In a drill head for a radial drill, including the drill spindle, a driving transmission for the spindle, including horizontal shiftable gears and vertically shiftable gears, a horizontally mounted cam for shifting the horizontally shiftable gears, and a vertically mounted cam for shifting the vertically shiftable gears, and means for operating said cam.

10. A spindle driving transmission, including a casing having a spindle assembly therein, a gear transmission extending to the driving spindle, a series of horizontally shiftable gears, a cam mounted on a horizontal axis for shifting said gears, a series of vertically shiftable gears, a cam mounted on a vertical axis for shifting said last-named gears, shifting levers extending from the last-named cam to the last-named gears, and counterbalancing means for supporting the weight of the gears.

11. A spindle driving mechanism, including a gear transmission and a casing supporting said transmission, a segmental cam rotatable for shifting certain of the gears, a lever for rotating the cam, telescoped shifter rods extending from the cam to the respective gears to be shifted, said gears to be shifted supported on vertical shafts, and means for counterbalancing the weight of the gears.

WILLIAM G. HOELSCHER.